United States Patent
Eriksson (10) Patent No.: US 9,675,043 B2
(45) Date of Patent: Jun. 13, 2017

(54) ROTARY PARLOUR ARRANGED TO HOUSE ANIMALS TO BE MILKED

(71) Applicant: DELAVAL HOLDING AB, Tumba (SE)

(72) Inventor: Jan Eriksson, Uttran (SE)

(73) Assignee: DELAVAL HOLDING AB, Tumba (SE)

( * ) Notice: Subject to any disclaimer, the term of this patent is extended or adjusted under 35 U.S.C. 154(b) by 140 days.

(21) Appl. No.: 14/364,694

(22) PCT Filed: Dec. 13, 2012

(86) PCT No.: PCT/SE2012/051390
§ 371 (c)(1),
(2) Date: Jun. 12, 2014

(87) PCT Pub. No.: WO2013/089628
PCT Pub. Date: Jun. 20, 2013

(65) Prior Publication Data
US 2014/0331934 A1 Nov. 13, 2014

Related U.S. Application Data

(60) Provisional application No. 61/576,536, filed on Dec. 16, 2011.

(30) Foreign Application Priority Data

Dec. 16, 2011 (SE) ........................................ 1151212

(51) Int. Cl.
*A01K 1/12* (2006.01)

(52) U.S. Cl.
CPC ................ *A01K 1/126* (2013.01); *A01K 1/12* (2013.01)

(58) Field of Classification Search
CPC .. A01K 1/126; A01K 1/12; A01J 5/017; A01J 7/00
(Continued)

(56) References Cited

U.S. PATENT DOCUMENTS

| 1,754,752 A | * | 4/1930 | Grim ........................ A01K 1/12 119/520 |
| RE22,657 E | * | 8/1945 | Babson et al. ........... A01K 1/12 119/14.03 |

(Continued)

FOREIGN PATENT DOCUMENTS

| EP | 0 451 906 A1 | 10/1991 |
| NL | 10008330 C2 | 12/1998 |

(Continued)

OTHER PUBLICATIONS

International-Type Search Report, dated Jun. 13, 2012, from corresponding PCT application.

(Continued)

*Primary Examiner* — Joshua Huson
*Assistant Examiner* — Morgan T Barlow
(74) *Attorney, Agent, or Firm* — Young & Thompson (57) ABSTRACT

A rotary parlor arranged to house animals to be milked includes an annular rotary platform (1), at least one milking stall (3) defined by at least one side wall element (2) and a storing device (8) adapted to hold teat cups (9) in a parking position, and a restricting element (8a, 13a, 16a) adapted to restrict the mobility of the animal (4) in the milking stall in a manner such that a free space (12) is created between the animal (4) and a side wall element (2) in a part of the milking stall (3), where the free space (12) is used by a robot arm (10) when fetching a teat cup in the storing device to attach to a teat of the animal (4) in the milking stall (3).

15 Claims, 4 Drawing Sheets

(58) Field of Classification Search
USPC .................. 119/516, 520, 522, 523, 732
See application file for complete search history.

(56) References Cited

U.S. PATENT DOCUMENTS

| | | | | |
|---|---|---|---|---|
| 2,601,623 | A * | 6/1952 | Norton | A01K 1/0011 119/523 |
| 2,747,544 | A * | 5/1956 | Thomas | A01J 7/00 119/14.13 |
| 2,904,005 | A * | 9/1959 | Mielke | A01K 15/04 119/520 |
| 2,957,451 | A | 10/1960 | Brockman | |
| 3,058,447 | A * | 10/1962 | Neuenschwander | A01K 15/04 119/520 |
| 3,166,045 | A * | 1/1965 | Bessette | A01K 1/0011 119/522 |
| 3,448,725 | A | 6/1969 | Holm et al. | |
| 3,572,294 | A * | 3/1971 | Baker et al. | A01K 1/0613 119/517 |
| 3,593,687 | A * | 7/1971 | Clegg | A01J 5/017 119/14.1 |
| 3,685,492 | A * | 8/1972 | Baker | A01K 1/0613 119/517 |
| 3,734,059 | A * | 5/1973 | Rodrigues | A01K 1/0613 119/520 |
| 3,861,355 | A * | 1/1975 | Johnson | A01J 5/017 119/14.08 |
| 3,870,021 | A * | 3/1975 | Nederbragt | A01J 5/017 119/14.13 |
| 3,973,520 | A * | 8/1976 | Flocchini | A01J 5/017 119/14.08 |
| 4,010,714 | A | 3/1977 | Notsuki et al. | |
| 4,034,714 | A * | 7/1977 | Umbaugh | A01J 7/04 119/14.18 |
| 4,726,322 | A * | 2/1988 | Torsius | A01K 1/12 119/14.14 |
| 5,000,119 | A * | 3/1991 | Moreau | A01K 1/126 119/14.03 |
| 5,259,335 | A * | 11/1993 | Moreau | A01K 1/12 119/14.03 |
| 5,469,808 | A * | 11/1995 | Street | A01K 1/12 119/14.03 |
| 5,606,932 | A * | 3/1997 | van der Lely | A01J 5/007 119/14.14 |
| 5,784,994 | A * | 7/1998 | van der Lely | A01J 5/0175 119/14.08 |
| 5,937,786 | A * | 8/1999 | Peacock | A01J 5/017 119/14.11 |
| 6,026,766 | A * | 2/2000 | Albers, Jr. | A01K 1/0011 119/520 |
| 6,050,219 | A * | 4/2000 | van der Lely | A01J 5/0175 119/14.04 |
| 6,334,406 | B1 * | 1/2002 | Eriksson | A01J 5/017 119/14.02 |
| 7,007,632 | B1 * | 3/2006 | Vrieze | A01K 1/0011 119/14.03 |
| 7,040,253 | B1 * | 5/2006 | Clark | B60P 3/04 119/412 |
| 2002/0124802 | A1 * | 9/2002 | van der Lely | A01J 5/0175 119/14.1 |
| 2003/0140870 | A1 * | 7/2003 | Daniels | A01K 1/0613 119/752 |
| 2003/0168014 | A1 * | 9/2003 | Aarts | A01J 5/007 119/14.02 |
| 2005/0132978 | A1 * | 6/2005 | Bentz | A01K 1/0613 119/732 |
| 2010/0031889 | A1 * | 2/2010 | Eriksson | A01K 1/126 119/14.02 |
| 2010/0236485 | A1 * | 9/2010 | Axelsson | A01K 1/126 119/14.02 |
| 2010/0282172 | A1 * | 11/2010 | Eriksson | A01J 5/007 119/14.02 |
| 2010/0300362 | A1 * | 12/2010 | Danneker | A01K 1/126 119/14.02 |
| 2011/0214612 | A1 * | 9/2011 | Andersson | A01J 5/0175 119/14.04 |
| 2011/0308469 | A1 * | 12/2011 | Vollmer | A01K 1/126 119/14.04 |
| 2012/0012060 | A1 * | 1/2012 | Eriksson | A01J 7/025 119/14.18 |

FOREIGN PATENT DOCUMENTS

| | | |
|---|---|---|
| SU | 105980 A1 | 9/1957 |
| SU | 300979 A1 | 6/1971 |
| SU | 1286133 A1 | 1/1987 |
| SU | 1658936 A1 | 6/1991 |
| SU | 1702987 A1 | 1/1992 |
| UA | 25076 | 7/2007 |
| WO | 2008/104416 A1 | 9/2008 |
| WO | 2008/118068 A1 | 10/2008 |
| WO | 2008/154247 A1 | 12/2008 |
| WO | 2010/112284 A1 | 10/2010 |

OTHER PUBLICATIONS

International Search Report, dated Mar. 21, 2013, from corresponding PCT application.

Supplementary International Search Report, dated Feb. 28, 2014, from corresponding PCT application.

* cited by examiner

ROTARY PARLOUR ARRANGED TO HOUSE ANIMALS TO BE MILKED

BACKGROUND OF THE INVENTION AND PRIOR ART

The present invention relates to a rotary parlour arranged to house animals to be milked, wherein the parlour comprises an annular rotary platform, at least one milking stall on the platform defined by at least one side wall element having a substantially radial extension on the platform and a storing device adapted to hold teat cups in a parking position.

In a conventional parallel rotary parlour, the cows walk on to an annular rotating platform and enter a milking stall. An operator attaches teat cups to the teats of the cows. The platform may rotate continuously with a constant low speed. The milking processes of the cows has been finished when the cows has rotated nearly 360 degrees on the platform. The continuous flow of cows makes that rotary parlours have a high milking capacity. A condition for a well working milking parlour is the existence of the operator that manually attaches the teat cups to the cows. However, it is desired to replace the operator by a well working robot arm.

WO 2008/118068 shows a parallel rotary parlour for automatic milking of cows. A robot arm is arranged on the outside of a rotary platform. In order to reach the teat cups in a storing device on the rotary platform and attach them to the teats of the cow, the robot arm has to extend past the rear legs of the cow and grip the teat cups in the storing device. It is here a risk that the robot arm comes in contact with a rear leg of the cow. In this case, it is a risk that the robot arm is being damaged by the cow or the cow is being injured by the robot arm.

SUMMARY OF THE INVENTION

The object of the present invention is to provide a rotary parlour, where a robot arm has to extend past at least one portion of the animal during an attaching process of the teat cups, where the risk that the robot arm being damaged or the animal injured is substantially eliminated.

This object is obtained, according to the invention, by the feature that the rotary parlour comprises restricting means adapted to restrict the mobility of the animal in the milking stall in a manner such that a free space is created between the animal and the side wall element in a part of the milking stall. By restricting the mobility of the animal in the milking stall in a suitable manner, it is possible to create a free space which is not occupied by any portion of the animal. It is preferable by many reasons to create such a free space at the side wall element of the milking stall. A robot arm using this free space does not risk coming in contact with said portion of the animal during the attaching process. The risk that the robot arm is being damaged by the animal or that the animal is being injured by the robot arm is thereby substantially eliminated.

According to an embodiment of the invention, the restricting means comprises a restricting element having a contact surface to be in contact with a portion of the animal at a distance from the side wall element such that said free space is created between the animal and the side wall element in said part of the milking stall. Thereby, the animal will be positioned at a predetermined distance from the side wall element. The distance between the contact surface and the side wall element corresponds to the width of the free space. The width of the free space has to have a size such that it can be used by a robot arm.

The restricting element may be a stationary arranged element in the milking stall. Such a stationary element may be a bar element or the like fixedly mounted on, for example, the side wall element or the floor surface in the milking stall. Alternatively, said stationary restricting element comprises a part of the storing device in the milking stall. In this case, the storing device may be provided with a portion projecting a predetermined distance into the milking stall.

According to an embodiment of the invention, said restricting element is movably arranged in the milking stall between a non-active position in which it does not substantially restrict the mobility of the animal in the milking stall and an active position in which it restricts the mobility of the animal in the milking stall such that said free space is created. By means of such a restricting element, it is possible to restrict the movability of the animal in the milking stall and create said free space only temporary. During other times, the restricting means does not restrict motions of the animal in the milking stall. The restricting means may comprise a power member adapted to move the restricting element between the non-active position and the active position. Such a power member may be a hydraulic cylinder or a pneumatic cylinder. The restricting means may also be constituted by inflatable members. A further advantage with such restricting means is that animals of different sizes might be milked and treated in the milking stall.

According to a further embodiment of the invention, the milking stall is defined by two side wall elements having a substantially radial extension on the platform. The side wall elements may comprise fences or corresponding element. Such side wall elements form milking stalls in which the animal stands in a radial direction on the annular platform stall. The restricting means may be adapted to restrict the mobility of the animal in the milking stall in a manner such that free spaces are created between the animal and the side wall elements on both sides of the animal. In this case it is possible to use two robot arms. A first robot arm may use the free space on one side of the animal for attaching at least one teat cup to the animal and a second robot arm may use the free space on the opposite side of the animal for attaching at least one teat cup to the animal. It is also possible to use one robot arm in this case which attaches teat cups to the teats from different sides of the animal.

According to a further embodiment of the invention, said restricting means comprises longitudinal restricting means adapted to restrict the mobility of the animal in a longitudinal direction in the milking stall. Thereby, it is possible to position the front legs and the rear legs of the udder of the animal in desired longitudinal positions in the milking stall. The longitudinal restricting means may be a movably arranged feeding trough which is placed in a position such that a rear portion of the animal comes in contact with a rump rail or the like defining a desired position of the rear portion of the animal in the milking stall.

According to a further embodiment of the invention, the storing device may be adapted to hold the teat cups in parking positions above the platform. Preferably, the storing device holds the teat cups in a parking position above the platform on one side of the animal and in a position situated in front of the rear legs and behind the front legs. In this case, the teat cups are parked in the storing device relatively close to the udder of the animal. Such a positioning of the storing device result in a relatively short pull out length of the milking tubes of the teat cups. Thereby, the risk is reduced that the milk tubes of the teat cups become entangled with each other. Preferably, the storing device is positioned in the vicinity of the side wall element. The storing device may comprise a part of it. The storing device may be attached to the side wall element or to a floor surface of the platform.

According to a further embodiment of the invention, the milking stall comprises storing devices situated on both sides of the animal, wherein each storing device is adapted to hold at least one teat cup in parking position when it is not attached to an animal in this milking stall. In this case, the teat cups from the storing device on the left side of the animal may be attached to the left teats of the animal and the teat cups from the storing device on the right teats of the animal may be attached to the teats on the right side of the animal. Preferably, the milking stall comprises restricting means creating two free spaces in the milking stall which can be used by two robot arm.

According to a further embodiment of the invention, said restricting means is adapted to create a free space between the animal and the side wall element at a part of the milking stall located between an outer edge portion of the platform and the storing device. If the robot arm has the gripping member in a resting position outside the outer edge portion of the platform, the robot arm has to extend from the outer edge portion of the platform to the storing device on the platform when it grips a teat cup in the storing device. In this case, it is necessary that said part of the milking stall constitutes a free space.

The initially defined object is also obtained, according to the invention, by a rotary parlour arrangement comprising a robot arm having a grip member adapted to be moved to a resting position, in which it is initially retracted to a position outside the platform, to a grip position in which it grips at least one teat cup in the storing device and to an attaching position in which it attaches the teat cup to a teat of the animal, characterized in that said free space is used by the robot arm at least when it moves the grip member from the resting position to the grip position.

The robot arm may move the grip member from the grip position to the attaching position via a space between a front leg and a rear leg of the animal. In this case, the robot arm uses the free space when it fetches a teat cup in the storing device and when it attaches the teat cup to a teat of an animal. Alternatively, the robot arm moves the grip member from the grip position to the attaching position via a space between the rear legs of the animal. In this case, the robot arm uses the free space when it fetches a teat cup in the storing device but not when it attaches the teat cup to a teat of an animal.

The rotary parlour arrangement may comprise
a restricting element having a contact surface to be in contact with a portion of the animal at a distance from the side wall element such that said free space is created between the animal and the side wall element in said part of the milking stall, wherein said restricting element is movably arranged element in the milking stall between a non-active position in which it does not substantially restrict the mobility of the animal in the milking stall and an active position in which it restricts the mobility of the animal in the milking stall such that said free space is created and
a control unit adapted to control a power member such that it moves the restricting element to the active position when the robot arm needs to use said free space and moves the restricting element to the non-active position when the robot arm does not need to use said free space.

The control unit may be a computer unit provided with a soft ware adapted to control the motions of the restricting element in a favorable manner. The control unit moves the restricting element to the non-active position during occasions when a mobility of the animal in the milking stall is desired. Such occasions are, for example, when an animal enters a milking stall, when an animal is milked and when an animal leaves the milking stall.

BRIEF DESCRIPTION OF THE DRAWINGS

In the following, preferred embodiments of the invention are described by examples and with references to the attached drawings, in which.

BRIEF DESCRIPTION OF PREFERRED EMBODIMENTS OF THE INVENTION

Figure 1:
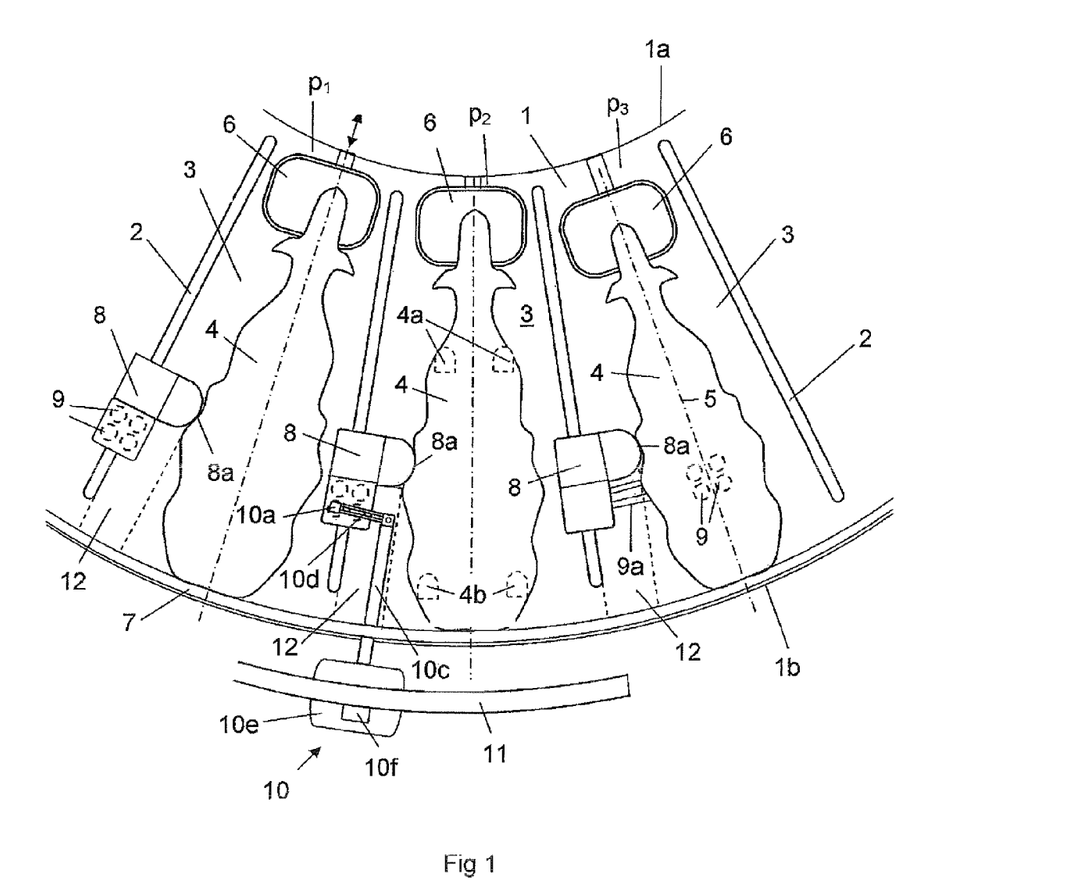
FIG. 1 shows a part of a rotary platform with milking stall comprising restricting means according to a first embodiment of the invention.

FIG. 1 shows a part of an annular rotary platform 1. The platform 1 is provided with a plurality of side wall elements 2 each having a substantially radial extension on the platform 1. The side wall elements 2 divide the annular platform into a plurality of milking stalls. FIG. 1 shows three of the milking stalls 3 on the rotary platform 1. A cow 4 is standing in the respective milking stall 3. The positions of the front legs 4a and the rear legs 4b of the cow 4 in one of the milking stalls 3 are indicated. The cows 4 are here standing in a substantially radial direction on the annular platform 1 with the heads at the vicinity of a radial inner edge portion 1a of the platform 1. The longitudinal axes 5 through the cows 4 are indicated.

Figure 2:
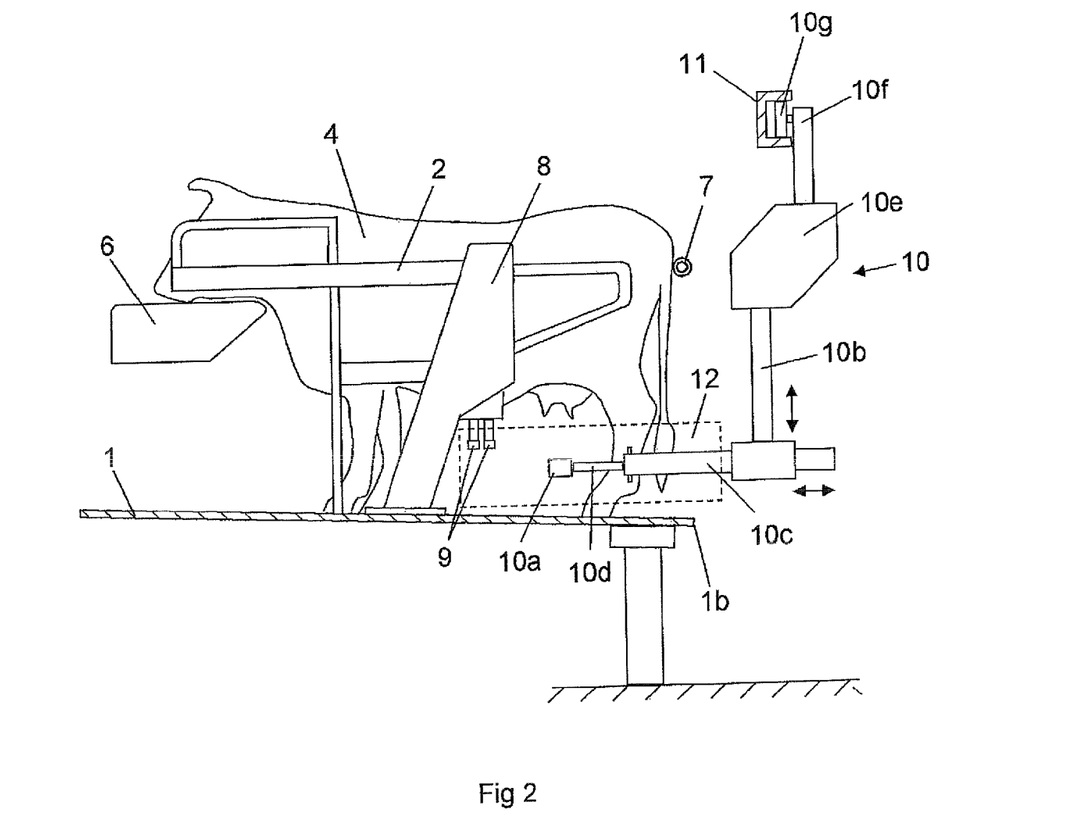
FIG. 2 shows a view from the side of a milking stall in FIG. 1.

Each milking stall 3 comprises a movably arranged feeding trough 6. A rump rail 7 is arranged at a distance above a radial outer edge portion 1b of the platform 1. The rump rail 7 is adapted to define the positions of the rear portions of the cows 4 in the milking stalls 3. Each milking stall 3 also comprises a storing device 8 adapted to store teat cups 9 to be used in the milking stall 3. The storing devices 8 with the teat cups 9 are, in this case, arranged on the left side of the cow 4 in the respective milking stalls 3. FIG. 2 shows one of the milking stalls 3 on the platform 1 from the side. The storing device 8 have a cabinet-like structure and it constitutes a part of a side wall element 2. The storing device 8 is mounted on a floor surface 1c of the platform 1. The storing device 8 holds four teat cups 9 in a parking position at a distance above the platform 1 on the left side of the cow 4. The parked teat cups 9 are positioned in front of the rear legs 4b and behind the front legs 4a of the cow 4 in the milking stall 3. The teat cups 9 are parked relatively close to the teats of the cow 4. Such a positioning of the storing device 8 results in a short pull out length of the milk tubes 9a when the teat cups 9 are attached to the teats of a cow 4 in the milking stall 3. Furthermore, the risk that the milk tubes 9a become entangled with each other during the milking process and a retracting process is relatively low.

A milking robot arm 10 is adapted to attach the teat cups 9 to the teats of the cow 4. The robot arm 10 comprises a gripping member 10a adapted to grip the parked teat cups 9 in the storing device and attach them to the teats of a cow 4. The robot arm 10 also comprises positioning means adapted to move the gripping member 10a to desired positions. The positioning means of the robot arm 10 comprises a first positioning element 10b adapted to adjust the position of the gripping member 10a in a vertical direction, a second positioning element 10c adapted to adjust the position of the gripping member 10a along a straight line path in a horizontal plane and a third positioning element 10d adapted to adjust the position of the grip member 10a in a horizontal plane by means of a pivoting motion. Furthermore, the robot arm 10 comprises a body 10e and a suspension device 10f by which the robot arm 10 is suspended in an overhead rail member 11. The rail member 11 has a curved extension substantially vertically above the radially outer edge portion 1b of the 1 platform 1. The suspension device 10f comprises rollers 10g or the like by which the robot arm 10 is movably arranged along the rail member 11.

Each milking stalls 3 comprises restricting means adapted to restrict the mobility of the cow in the milking stall 3 in a manner such that a free space 12 is created between the cow 4 and the left side wall element 2 in a predetermined part of the milking stall 3. Said predetermined part of the milking stall 3 is, in this case, located between an outer edge portion 1b of the platform and the storing device 8. The free space 12 is indicated with doted lines in the figures. In the embodiment shown in FIG. 1, the restricting means comprises a contact surface 8a of the storing device 8. The storing device 8 has here a design with a protruding portion comprising said contact surface 8a The contact surface 8a is located at a predetermined distance from the side wall element 2. The contact surface 8a is adapted to come in contact with a side portion of the cow 4. The contact surface 8a prevents that the cow 4 comes too close the left side wall element 2. The contact surface 8a ensures that the cow 4 will be positioned at at least a predetermined distance from the side wall element 2. Said distance constitutes the width of the free space 12. The free space 12 may have a height corresponding to the height of the legs of the cows 4.

During operation of the rotary parlour, a cow 4 to be milked enters a milking stall 3 at the first rotation position $p_1$. The feeding trough 6 is adjusted to a position such that it moves the cow 4 to a position in which an end portion of the cow 4 comes in contact with the rump rail 7. Thereby, the movably arranged feeding trough 6 defines a milking position of the cow 4 in a longitudinal direction in the milking stall 3. The rear legs 4b of the cow 4 are here in a position relatively close to radially outer edge portion 1b of the platform 1. The contact surface 8a of the storing device 8 ensures that no part of the cow 4 occupies said free space 12.

The robot arm 10 may be located in a resting position outside the radially outer edge portion 1b of the platform 1. The robot arm 10 is moved from the resting position when the milking stall 3 reaches a second rotation $p_2$. Initially, the first positioning element 10b of the robot arm 10 may be activated in order to adjust the position of the gripping member 10a to a suitable vertical level above the floor surface 1c of the platform. The second positioning element 10c moves then the gripping member 10a along a straight line path into the free space 12. The gripping member 10a is here moved through a space between the left side wall element 2 and the left rear leg of the cow 4. The gripping member 10a is moved to a position on the platform 1 in the vicinity of the storing device 8.

The third positioning element 10d performs then a pivoting motion of the gripping member 10a to a gripping position, in which the gripping member 10a is able to grip a teat cup 9 in the storing device 8. FIG. 1 shows the gripping member 10a in the gripping position. As soon as the gripping device 1 has gripped a teat cup 2 in the storing device 11, the third positioning element 10d performs a pivoting motion of the gripping member 10a in a direction such the gripping member 10a is moved from the storing device 8 to a position below the udder of the cow 4. The gripping member 10a and the teat cup 9 are moved to this position via a space between a front leg 4a and a rear leg 4b of the cow 4.

Finally, the first positioning element 9b moves the gripping member upwards to an attaching position in which the teat cup 9 is attached to a teat of the cow 4. During this gripping and attaching process of the teat cup 9, the whole robot arm 1 can be moved along the curved rail member 11 with the same velocity as the platform 1. Thereby, it is possible to avoid mutual motions between the robot arm 10 and the cow 4 on the rotary platform 1. The milking robot 10 may fetch one teat cup 9 from the storing device 8 at a time. Alternatively, the milking robot 10 fetches more than one teat cup from the storing device 8 at a time. When all teat cups 9 have been attached to the teats of the cow 4, the robot arm 10 is retracted to the resting position outside the radial outer edge portion 10b of the platform 1.

The robot arm 10 uses the free space 12 at the left side wall element 2 during the whole attaching process of the teat cups 9. Due to the existence of said contact surface 8a, no portion of the cow 4, such as the left rear leg of the cow 4, are able to occupy said free space 12 during the attaching process of the teat cups 9. Thus, the robot arm 10 will not come in contact with any portion of the cow 4 in the free space 12 during the attaching process of the teat cups 9. Consequently, there is no risk that the cow 4 being injured by the robot arm 10 or the robot arm 10 being damaged by the cow 4 when the robot arm 10 extends past the rear legs 4b of the cow 4 during the attaching process of the teat cups 9. When the milking stall 3 reaches the third rotation position $p_3$, the milking process of the cow 4 starts. As soon as the milking process of the cow 4 has been finished, a not shown retraction device in the storing device 8 is activated. The retraction device provides a pulling force in the respective milk conduits 9a of the teat cups 9 such that they are removed from the teats of the cow 4 and pulled back to the parking positions in the storing device 8.

Figure 3:
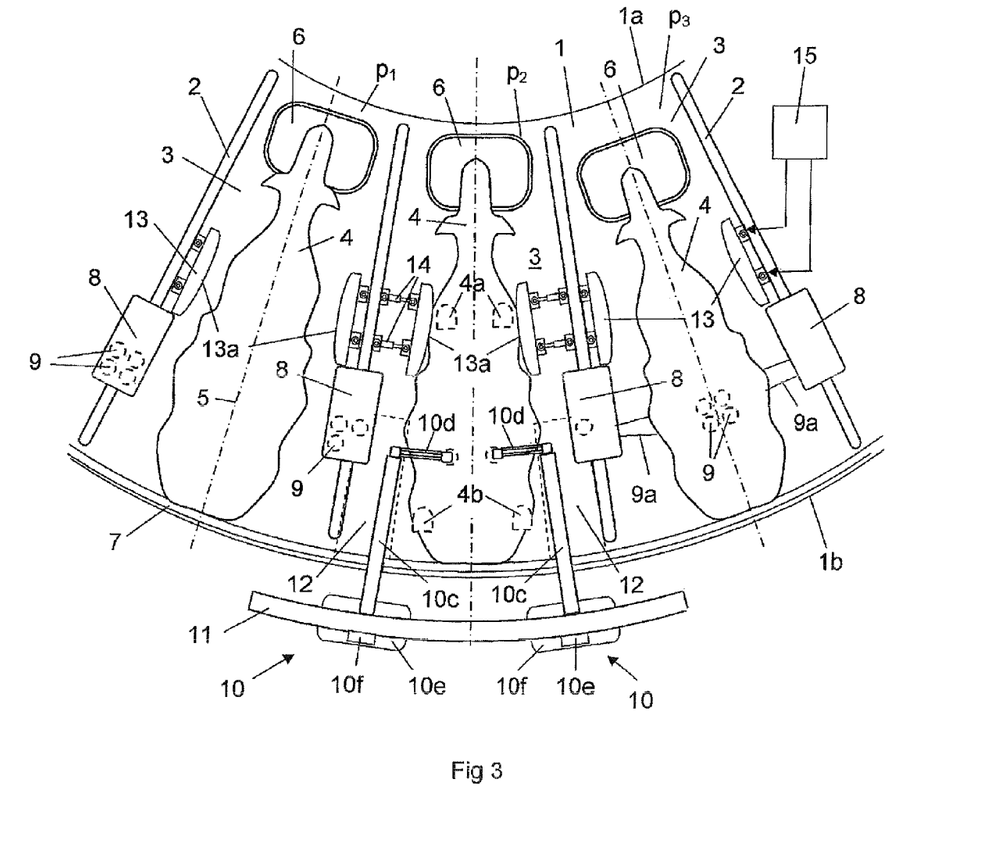
FIG. 3 shows a part of a rotary platform with milking stall comprising restricting means according to a second embodiment of the invention and FIG. 4 shows a part of a rotary platform with milking stall comprising restricting means according to a third embodiment of the invention.

FIG. 3 shows a alternative embodiment of the invention. In this case, two robot arms 10 are used for attaching the teat cups 9 to the teats of the cows 4 when the milking stall 3 is in the second rotational position $p_2$. A first robot arm 10 fetches two teat cups 9 which are parked in a storing device 8 arranged on the left side of the cow 4 and attaches them to the left teats of the cow 4 in the milking stall 3. At substantially the same time, a second robot arm 10 fetches two teat cups 9 which are parked in a storing device 8 on the right side of the cow 4 and attaches them to the right teats of the cow 4. FIG. 3 shows the robot arms 10 in the attaching position. The robot arms 10 are retracted to a resting position outside the radial outer edge portion 1b of the platform 1 when the teat cups 9 have been attached to the teats of the cow 4.

In this case, each milking stall 3 comprises two movably arranged restricting elements 13. The restricting elements 13 are mounted on opposite sides of the milking stall 3 on a respective side wall element 2. The restricting elements 13 are movable between a non-active position in which they substantially do not restrict the mobility of the cow 4 in the milking stall 3 and an active position in which they restrict the mobility of the cow 4 in a transverse direction in the milking stall 3 such that free spaces 12 are created on both sides of the cow 4. The movably arranged restricting elements 13 comprise a contact surface 13a adapted to come in contact with a side portion of the cow 4 at a predetermined distance from the side wall element 2. The restricting elements 13 are movably arranged by means of power members 14. The power members 14 may, for example, be hydraulic cylinders or pneumatic cylinders. A schematically disclosed control unit 15 controls the power members 14.

During operation of the rotary parlour, a cow 4 to be milked enters the milking stall 3 in the first rotation position $p_1$. The restricting elements 13 are here in the non-active position such they do not restrict the mobility of the cow 4 when it enters the platform 1. The feeding trough 6 is adjusted to a position such that it moves the cow 4 in the longitudinal direction to a position in which an end portion of the cow 4 comes in contact with the rump rail 7. When the milking stall 3 reaches the second rotation position $p_2$, the control unit 15 activates the power members 14 such they move the restricting elements 13 from the non-active position to the active position. The contact surfaces 13a of the restricting elements 13 moves to a position at a predetermined distance from the respective side wall elements 2. Thereby, the cow 4 will be positioned in the milking stall 3 at at least said predetermined distance from the respective side wall elements 2. Free spaces 12 are here created on both sides of the cow 4. A first free space 12 is created at the left side wall element 2 of the milking stall 3 and a second free space is created at the right side wall element 2 of the milking stall 3.

The robot arms 10 are located in a resting position substantially radially outside the respective free space 12 when the milking stall 3 reaches the second rotation position $p_2$. The second positioning elements 10c of each robot arm 10 moves the gripping members 10a along a straight line path into the respective free spaces 12. One robot arm 10 is moved through a space between the left wall element 2 and the left rear leg 4b of the cow 4 and the other robot arm 10 is moved through a space between the right wall element 2 and the right rear leg 4b of the cow 4. The gripping members 10a of the robot arms 10 are moved to a position in the vicinity of the respective storing devices 8 in the milking stall 3.

Each third positioning element 10d of robot arms 10 performs a pivoting motion of the gripping members 10a to a gripping position, in which each gripping member 10 is able to grip a teat cup 9 in the respective storing devices 8. Each third positioning element 10d of the robot arm performs then a pivoting motion of the gripping member 10a in an opposite direction to a position below the udder of the cow 4. One gripping member 10a is moved to this position via a space between a left front leg 4a and a left rear leg 4b of the cow 4 and the other gripping member 10a is moved to this position via a space between a right front leg 4a and a right rear leg 4b of the cow 4. Finally, each first positioning element 10b of the robot arms 10 moves the gripping member 10a upwards to an attaching position in which the teat cup 9 is attached to a teat of the cow 4. Thereafter, each robot arm 10 fetches the remaining teat cup 9 in the respective storing devices 8 and attaches them to the remaining teats of the cow 4. When all teat cups 9 have been attached to the teats of the cow 4, the robot arms 10 are retracted to the resting positions outside the radial outer edge portion 1b of the platform 1. At the same time, the control unit 15 activates the power members 14 such the restricting elements 13 are moved from the active position to the non-active position. Thus, during the following milking process of the cow 4, it is possible for the cow 4 to perform motions in a transverse direction in the milking stall 3. In this case, the restricting elements 13 are only moved to the active position during the attachment process of the teat cups 9.

Figure 4:
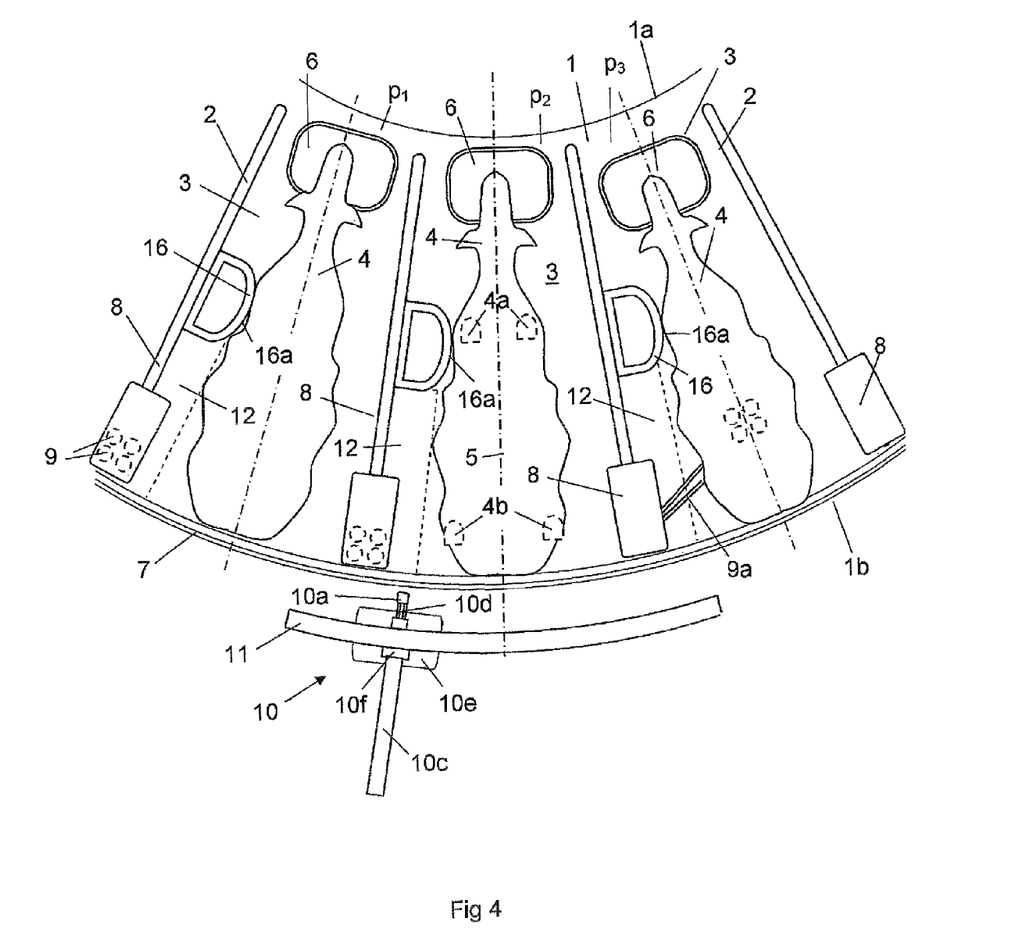

FIG. 4 shows a further alternative embodiment of the invention. In this case, each milking stalls 3 comprises a stationary restricting element arranged on a left side wall element 2 of the milking stall 3. The restricting element is here a bar element 16 having a contact surface 16a adapted to restrict the mobility of the cow 4 in the milking stall 3 in a manner such that a free space 12 is created at the left side wall element 2. Each milking stall 3 comprises a storing device 8 with teat cups 9 forming a part of left side wall element 2. The storing devices 8 are here arranged in the vicinity of the radial outer edge portion 1b of the platform 1.

During operation of the rotary parlour, a cow 4 to be milked enters a milking stall 3 in the first rotation position $p_1$. The contact surfaces 16a of the bar element 16 ensures that the cow 4 will be positioned in the milking stall 3 at at least a predetermined distance from the left side wall element 2. Thus, a free space 12 is created between the cow 4 and said side wall element 2. FIG. 4 shows the robot arm 10 in a resting position. When the milking stall 3 reaches the second rotation position $p_2$, robot arm 10 is activated. The gripping member 10a of the robot arm 10 grips a teat cup 9 in the storing device 8. The gripping member 10a and the teat cup 9 are moves through said free space 12 to a suitable position on the platform 1. Thereafter, the robot arm 10 moves the gripping member 10a with the teat cup to an attaching position via the space between the front leg 4a and the rear leg 4b of the cow 4. When the teat cup has been attached to a teat, the robot arm 10 fetches and attaches the remaining teat cups 9 to the teats of the cow 4 in a correspondingly manner.

The invention is not limited to the described embodiments but may be varied and modified freely within the scope of the claims.

The invention claimed is:

1. A rotary parlour arranged to house an animal (4) to be milked, comprising:
   an annular rotary platform (1);
   a milking stall (3) on the platform defined, on a first side, by a side wall element (2) having a substantially radial extension on the platform (1);
   a storing device (8) that holds teat cups (9) in a parking position;
   a restricting unit located adjacent the side wall element, the restricting unit comprising a restricting element with a contact surface, the restricting unit comprising power members (14) connected to the side wall element (2) and to the restricting element (13a);
   at least one robot with a robot arm; and
   a control unit (15) operatively connected to the robot and to the restricting unit, the power members (14), upon activation by the control unit (15), moving the restricting element (13a) from i) an in-active position adjacent the side wall element (2) and not restricting the mobility of the animal to ii) an active position,
   wherein when the animal is present in the milking stall (3), the entire contact surface bears against a side body portion of the animal thereby restricting mobility of the animal in a manner that creates a free space (12) between the animal (4) and the side wall element (2), wherein the side body portion is defined between a front leg of the animal and the teats of the animal, and wherein the robot arm moves within the free space when attaching the teat cups to the teats of the animal.

2. The rotary parlour of claim 1, wherein said restricting element is a non-stationary arranged element mounted to the side wall element (2) with the contact surface (13a), in the active position, protruding from the storing device (8) at a height such that the animal is positioned at least at a predetermined distance from the side wall element (2) with distance constituting a width of the free space (12).

3. The rotary parlour of claim 2, further comprising:
another side wall element (2) having a substantially radial extension on the platform (1) and defining a second side of the milking stall (3);
another of said restricting unit mounted on said other side wall element (2) and movable to another active position,
wherein the at least one robot includes a pair of robots, each robot with a respective robot arm, and
the control unit (15) is operatively connected to the robot and to each of the restricting units,
wherein the restricting units each comprise power members (14) connected to corresponding ones of the side wall elements (2) and to corresponding ones of the restricting elements (113a),
wherein each of the power members (14), upon activation by the control unit (15), move both of the restricting elements (13a) from i) an in-active position adjacent the side wall element (2) and not restricting the mobility of the animal to ii) the active positions to create a free space in the milking stall between a) the animal and b) each of the side wall elements, and
wherein each of the robot arms move within a corresponding one of the free spaces when attaching the teat cups to the teats of the animal.

4. The rotary parlour of claim 3, wherein the power members (14) are one of the group consisting of hydraulic cylinders and pneumatic cylinders.

5. The rotary parlour of claim 2, wherein the contact surface (13a) comprises, in plan view, an arcuate curved edge that protrudes from the storing device (8) towards and contacts the side body portion of the animal.

6. The rotary parlour of claim 1, wherein the power members (14) are one of the group consisting of hydraulic cylinders and pneumatic cylinders.

7. The rotary parlour of claim 1, wherein said restricting unit further comprises a longitudinal movement restricting element (6) that restricts the mobility of the animal (4) in a longitudinal direction in the milking stall (3).

8. The rotary parlour of claim 7, wherein said longitudinal movement restricting element (6) is movable in the longitudinal direction in the milking stall (3).

9. The rotary parlour of claim 1, wherein the storing device (8) is attached to the side wall element (2).

10. The rotary parlour of claim 1, wherein the storing device (8) is attached to a floor surface (1c) of the platform (1).

11. The rotary parlour of claim 1, wherein the free space (12) between the animal (4) and the side wall element (2) extends between an outer edge portion (1b) of the platform and the storing device (8).

12. The rotary parlour of claim 1, wherein said restricting unit further comprises
i) a first longitudinal restricting element (6), arranged at a distance above a radial inner edge portion (1a) of the platform (1), that restricts the mobility of the animal (4) in a longitudinal direction in the milking stall (3), and
ii) a second longitudinal restricting element (7), arranged at a distance above a radial outer edge portion (1b) of the platform (1), that restricts the mobility of the animal (4) in the longitudinal direction in the milking stall (3).

13. The rotary parlour of claim 12, wherein the first longitudinal restricting element (6) is a movable feeding trough and the second longitudinal restricting element (7) is a rump rail (7).

14. The rotary parlour of claim 1, wherein the robot arm is configured to move unimpeded within the free space when attaching the teat cups to the teats of the animal.

15. The rotary parlour of claim 14, wherein the free space is formed between the teat cup storing device and the rear hip region of the animal when the restricting element is moved to engage the against the side body portion of the animal in the active position.

* * * * *